United States Patent
Li et al.

(10) Patent No.: US 12,019,716 B2
(45) Date of Patent: Jun. 25, 2024

(54) MULTIMEDIA CONTENT RECOGNITION WITH LOCAL AND CLOUD-ASSISTED MACHINE LEARNING

(71) Applicant: Avago Technologies International Sales Pte. Limited, Singapore (SG)

(72) Inventors: Yong Li, San Diego, CA (US); Xuemin Chen, Rancho Santa Fe, CA (US); Brett Tischler, San Diego, CA (US); Prashant Katre, San Diego, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 622 days.

(21) Appl. No.: 16/661,894

(22) Filed: Oct. 23, 2019

(65) Prior Publication Data

US 2020/0184043 A1 Jun. 11, 2020

Related U.S. Application Data

(60) Provisional application No. 62/778,228, filed on Dec. 11, 2018.

(51) Int. Cl.
  *G06Q 30/00* (2023.01)
  *G06F 18/22* (2023.01)
  (Continued)

(52) U.S. Cl.
  CPC .............. *G06F 21/16* (2013.01); *G06F 18/22* (2023.01); *G06F 18/28* (2023.01); *G06F 21/125* (2013.01);
  (Continued)

(58) Field of Classification Search
  None
  See application file for complete search history.

(56) References Cited

U.S. PATENT DOCUMENTS 6,400,996 B1 * 6/2002 Hoffberg ............... G06F 3/0482
  700/86
6,850,252 B1 * 2/2005 Hoffberg ............... H04N 21/475
  380/252

(Continued)

FOREIGN PATENT DOCUMENTS

EP      2221742 A1 * 8/2010 ............. G06F 21/10
WO  WO-2005017781 A1 * 2/2005 ............. H04N 5/147

OTHER PUBLICATIONS

Darío Baptista et al. "Implementation Strategy of Convolution Neural Networks on Field Programmable Gate Arrays for Appliance Classification Using the Voltage and Current (V-I) Trajectory." (Jul. 26, 2018). Retrieved online Jun. 2, 2022. https://www.mdpi.com/1996-1073/11/9/2460/htm (Year: 2018).*

(Continued)

*Primary Examiner* — James A Reagan

(57) ABSTRACT

A system for multimedia content recognition includes a cloud server and a media client including a silicon-on-chip (SoC) device to communicate with the cloud server via a network. The SoC device includes a local area network (LAN) interface to receive media content from a media source and a media monitor to analyze the received media content and to generate signature information for transmission to the cloud server or for a local analysis. The SoC device further includes an inference engine to locally analyze the signature information to detect an unauthorized access.

20 Claims, 7 Drawing Sheets

(51) Int. Cl.
*G06F 18/28* (2023.01)
*G06F 21/12* (2013.01)
*G06F 21/16* (2013.01)
*G06N 5/04* (2023.01)
*G06N 20/00* (2019.01)
*G06V 10/772* (2022.01)
*G06V 20/40* (2022.01)

(52) U.S. Cl.
CPC ............... *G06N 5/04* (2013.01); *G06N 20/00* (2019.01); *G06V 10/772* (2022.01); *G06V 20/46* (2022.01)

(56) References Cited

U.S. PATENT DOCUMENTS

| | | | | |
|---|---|---|---|---|
| 7,813,822 | B1* | 10/2010 | Hoffberg | H04N 7/163 |
| | | | | 381/73.1 |
| 8,037,449 | B2* | 10/2011 | Iborra | G06F 16/2365 |
| | | | | 717/105 |
| 8,141,031 | B2* | 3/2012 | Iborra | G06F 8/35 |
| | | | | 717/113 |
| 8,245,183 | B2* | 8/2012 | Iborra | G06F 8/35 |
| | | | | 717/104 |
| 8,600,830 | B2* | 12/2013 | Hoffberg | G06Q 30/08 |
| | | | | 705/14.71 |
| 10,116,679 | B1* | 10/2018 | Wu | H04L 63/102 |
| 10,326,676 | B1* | 6/2019 | Driggs | H04L 41/142 |
| 10,559,202 | B2* | 2/2020 | Yang | G06V 10/82 |
| 10,719,744 | B2* | 7/2020 | Smith | G06V 20/00 |
| 10,742,399 | B2* | 8/2020 | Chen | G06V 10/82 |
| 10,778,412 | B2* | 9/2020 | Chen | G06F 16/54 |
| 10,797,863 | B2* | 10/2020 | Chen | H04L 67/51 |
| 10,891,535 | B1* | 1/2021 | Mancuso | H04L 63/0428 |
| 11,068,757 | B2* | 7/2021 | Strong | G06K 9/6228 |
| 11,139,958 | B2* | 10/2021 | Smith | H04W 4/70 |
| 11,145,201 | B2* | 10/2021 | Yang | G06F 9/505 |
| 11,328,059 | B2* | 5/2022 | Rudnik | G06F 21/567 |
| 11,416,958 | B1* | 8/2022 | Reichert | H04W 4/029 |
| 2006/0026017 | A1* | 2/2006 | Walker | H04L 63/302 |
| | | | | 701/31.4 |
| 2006/0206246 | A1* | 9/2006 | Walker | H04L 63/302 |
| | | | | 701/16 |
| 2009/0113545 | A1 | 4/2009 | Pic et al. | |
| 2009/0254572 | A1* | 10/2009 | Redlich | G06Q 10/06 |
| 2010/0070448 | A1* | 3/2010 | Omoigui | H01L 27/1463 |
| | | | | 706/55 |
| 2012/0240236 | A1* | 9/2012 | Wyatt | G06F 21/564 |
| | | | | 726/25 |
| 2012/0317645 | A1* | 12/2012 | Fortier | G06F 21/566 |
| | | | | 726/24 |
| 2014/0278985 | A1* | 9/2014 | Ramakrishnan | G06Q 30/0256 |
| | | | | 705/14.54 |
| 2016/0044045 | A1 | 2/2016 | Stiansen et al. | |
| 2016/0099963 | A1* | 4/2016 | Mahaffey | G06F 21/554 |
| | | | | 726/25 |
| 2017/0093910 | A1* | 3/2017 | Gukal | H04L 63/1416 |
| 2017/0232300 | A1* | 8/2017 | Tran | H04L 67/535 |
| | | | | 434/247 |
| 2018/0069899 | A1* | 3/2018 | Lang | H04L 63/0263 |
| 2019/0042867 | A1* | 2/2019 | Chen | H04L 67/12 |
| 2019/0042870 | A1* | 2/2019 | Chen | G06K 9/6232 |
| 2019/0042900 | A1* | 2/2019 | Smith | G06V 10/96 |
| 2019/0043201 | A1* | 2/2019 | Strong | G06K 9/6228 |
| 2019/0043351 | A1* | 2/2019 | Yang | G06F 9/4881 |
| 2019/0045207 | A1* | 2/2019 | Chen | G06V 10/40 |
| 2019/0392354 | A1* | 12/2019 | Yang | G06N 5/04 |
| 2020/0159961 | A1* | 5/2020 | Smith | G06N 3/08 |
| 2020/0250003 | A1* | 8/2020 | Yang | G06N 5/022 |
| 2020/0303060 | A1* | 9/2020 | Haemel | G06N 3/063 |
| 2020/0357276 | A1* | 11/2020 | Yang | G06V 40/103 |
| 2021/0174155 | A1* | 6/2021 | Smith | G06K 9/6228 |
| 2021/0194674 | A1* | 6/2021 | Chen | H04W 4/70 |
| 2021/0243012 | A1* | 8/2021 | Chen | G06F 16/535 |
| 2021/0266145 | A1* | 8/2021 | Chen | H04L 9/3239 |

OTHER PUBLICATIONS

S. R. Vijayalakshmi et al. "Embedded Vision an Introduction." (Aug. 21, 2013). Retrieved online Jun. 2, 2022. https://terrorgum.com/tfox/books/embeddedvision.pdf (Year: 2013).*

Shi, et al., "Detecting tunneled video streams using traffic analysis," 7th International Conference on Communication Systems and Networks, Jan. 2015.

* cited by examiner

MULTIMEDIA CONTENT RECOGNITION WITH LOCAL AND CLOUD-ASSISTED MACHINE LEARNING

CROSS-REFERENCE TO RELATED APPLICATIONS

This application claims the benefit of priority under 35 U.S.C. § 119 from U.S. Provisional Patent Application 62/778,228, filed Dec. 11, 2018, which is incorporated herein by reference in its entirety.

TECHNICAL FIELD

The present description relates in general to content-distribution systems, including multimedia content recognition with local and cloud-assisted machine learning.

BACKGROUND

In multimedia processing systems, streaming services of audio data and video data are vulnerable to piracy and require protection against unauthorized usage. The loss associated with piracy and unauthorized access is greatest in high-value multimedia content. Since digital multimedia content in clear form can sometimes be used to create unauthorized versions of high-value multimedia content in particular, it is necessary to enable the security of multimedia content with protection against unauthorized access or usage. However, the monitoring and detection of such unauthorized access or usage of multimedia content can be burdensome.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology provides for a cloud-assisted media content recognition scheme, wherein a client system-on-chip (SoC) device receives the audio/video/image media content via streaming/downloading/broadcasting from audio/video sources. The examples of the client SoC device are a set-top-box (STB) and a residential media gateway with Internet access. The client SoC device processes the received media and renders it to the local output devices (e.g. a video display or speakers).

The client SoC device generates the "signature" information about the received media and sends it to a cloud server for media-content recognition via an analysis engine based on machine-learning (ML) algorithms including deep-learning algorithms. These algorithms are also referred to as ML models. The signature information is represented by appropriate analytic data of the received media that characterizes the media.

Alternatively, the cloud server can deploy the pre-trained ML models to the client SoC device. The signature information collected or generated by a client SoC device is directly used as the input for an inference engine that is programmed or installed with the pre-trained ML models. The inference results are sent to the cloud server for further analysis.

In both cases, the analysis by the cloud server can detect unauthorized access or usage of the client SoC devices (e.g., detecting installed applications that are unauthorized) or create appropriate response to the client SoC device(s). Based on the analysis results from the analysis engine or the inference results received from the client SoC device, the cloud server initiates appropriate actions.

Figure 1:
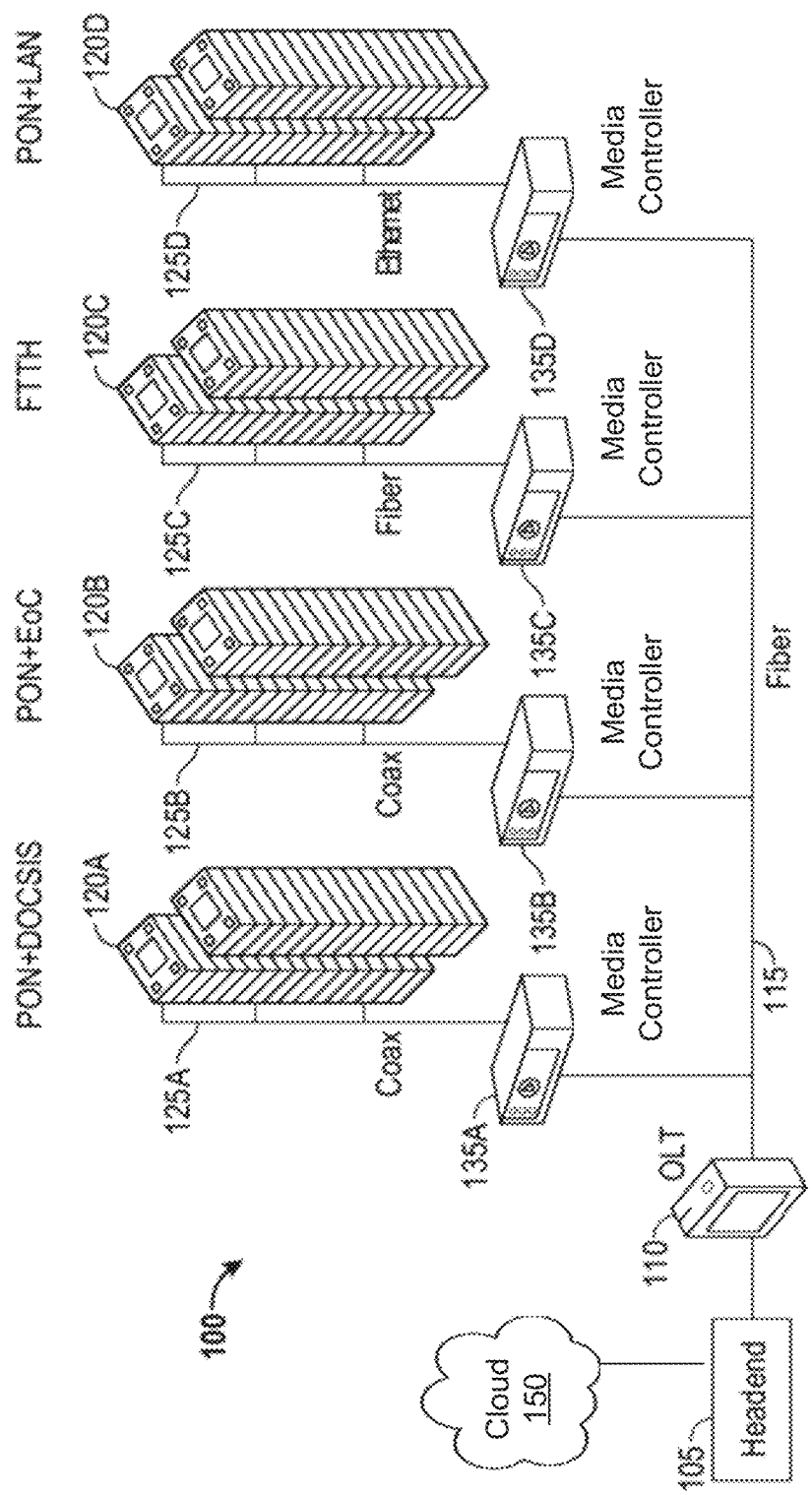
FIG. 1 illustrates an example network environment in which a content-distribution system having multimedia content recognition with local and cloud-assisted machine learning may be implemented, in accordance with one or more implementations.

FIG. 1 illustrates an example network environment 100 in which a content-distribution system having multimedia content recognition with local and cloud-assisted machine learning may be implemented, in accordance with one or more implementations. The example network environment 100 includes a headend 105, an optical-line terminal (OLT) 110, buildings 120A-D, media controllers 135A-D, a first transmission network 115 and second transmission networks 125A-D, and a cloud 150. The buildings 120A-D may be multi-dwelling units, houses, offices or any general structures. In one or more implementations, one or more of the buildings 120A-D may represent a collection of separate structures, such as a subdivision of separate houses. In one or more implementations, the media controllers 135A-D generally refer to "fiber nodes," where a transmission media over optical fiber is redistributed to a transmission media over coaxial cable and vice versa. In some aspects, one or more of the media controller 135A-D are also coupled to the cloud 150.

The buildings 120A-D may include multiple gateway devices that are located in different units of the buildings 120A-D, such as different offices or dwelling units. The gateway devices may be coupled to the media controllers 135A-D via the second transmission networks 125A-D and may be coupled to one or more user devices within the different units via local area networks (LANs). The second transmission networks 125A-D may include network couplings and/or adapters, such as splitters, and may include any network medium, such as coaxial transmission lines, fiber-optic transmission lines, Ethernet transmission lines or power transmission lines. In one or more implementations, the second transmission networks 125A-D may include a non-optical network medium, such as coaxial transmission lines.

In the network environment 100, the second transmission network 125A is represented as a data-over-cable service-interface specification (DOCSIS) network that includes coaxial transmission lines; the second transmission network 125B is represented as an Ethernet over coaxial (EoC) network that includes coaxial transmission lines; the second transmission network 125C is represented as part of a fiber-to-the-home (FTTH) network that includes fiber-optic transmission lines; and the second transmission network 125D is represented as a LAN that includes Ethernet transmission lines.

The media controllers 135A-D may be coupled to the gateway devices via the second transmission networks 125A-D and may be coupled to the OLT 110 via the first transmission network 115. The first transmission network 115 may include one or more network couplings, or adapters, such as splitters, and may include any network medium, such as coaxial transmission lines, fiber-optic transmission lines, Ethernet transmission lines or power transmission lines. In one or more implementations, the first transmission network 115 may include an optical network medium and one or more optical splitters. In one or more implementations, the second network medium may be different than the first network medium. In the network environment 100, the first transmission network 115 is represented as a passive optical network (PON) that includes fiber-optic transmission lines.

Since the media controllers 135A-D are coupled to the gateway devices via the second transmission networks 125A-D and are coupled to the OLT 110 via the first transmission network 115, the media controllers 135A-D may convert signals received over the first transmission network 115, such as optical signals, to signals that can be transmitted over the second transmission networks 125A-D, such as electrical signals. In one or more implementations, the media controllers 135A-D may act as layer-2 bridges, which receive data packets from the OLT 110 of the headend 105 over an optical network medium of the first transmission network 115 and bridge the received data packets over the non-optical network medium of the second transmission networks 125A-D to the gateways and vice versa.

The headend 105 is coupled to the cloud 150 and may include one or more devices, such as network devices, transmitters, receivers or servers, that are part of a content-delivery network that coordinates the delivery of content items such as television programs, movies, songs or other audio programs, educational materials, community information or generally any content items to the user devices of the buildings 120A-D. The content items may be delivered to the user devices via any content-delivery mechanism. The headend 105 may use the OLT 110 to communicate over the first transmission network 115 with the media controllers 135A-D.

The media controllers 135A-D and the gateway devices may each include local caches, such as hard drives or other memory devices, for storing content items received from the headend 105 that are intended for distribution to the user devices. For example, the headend 105 may transmit content items that are expected to be requested by the user devices, such as popular movies or television shows, to the media controllers 135A-D and/or the gateway devices during off-peak hours. For example, if the headend 105 determines that there is a popular television series for which a not-yet-aired episode is expected to be requested by many of the user devices when the episode airs (or otherwise becomes available), the headend 105 may transmit the not-yet-aired episode to one or more of the media controllers 135A-D and/or one or more of the gateways during off-peak hours, such as the night before the episode is scheduled to air (or otherwise become available). In this manner, the simultaneous viewing of the episode by many of the user devices the next day will not overwhelm the first transmission network 115 and/or the second transmission networks 125A-D. Similarly, if a user device is accessing an episode of a television series on-demand, the headend 105 can coordinate the caching of one or more subsequent episodes to a media controller 135A and/or a gateway device that is upstream from the user device.

In one or more implementations, the headend 105 may receive an indication from a third-party server, such as a content-provider server, that a particular content item is expected to be requested by multiple user devices. For example, the headend 105 may receive an indication from an audio-content provider that an upcoming release of a song and/or album of a certain artist or style is expected to be requested by many of the user devices. The headend 105 may then transmit the song and/or album to the media controllers 135A-D and/or the gateway devices in advance of the release date, such as the night before, e.g., during an off-peak, or low-traffic, period.

Figure 2:
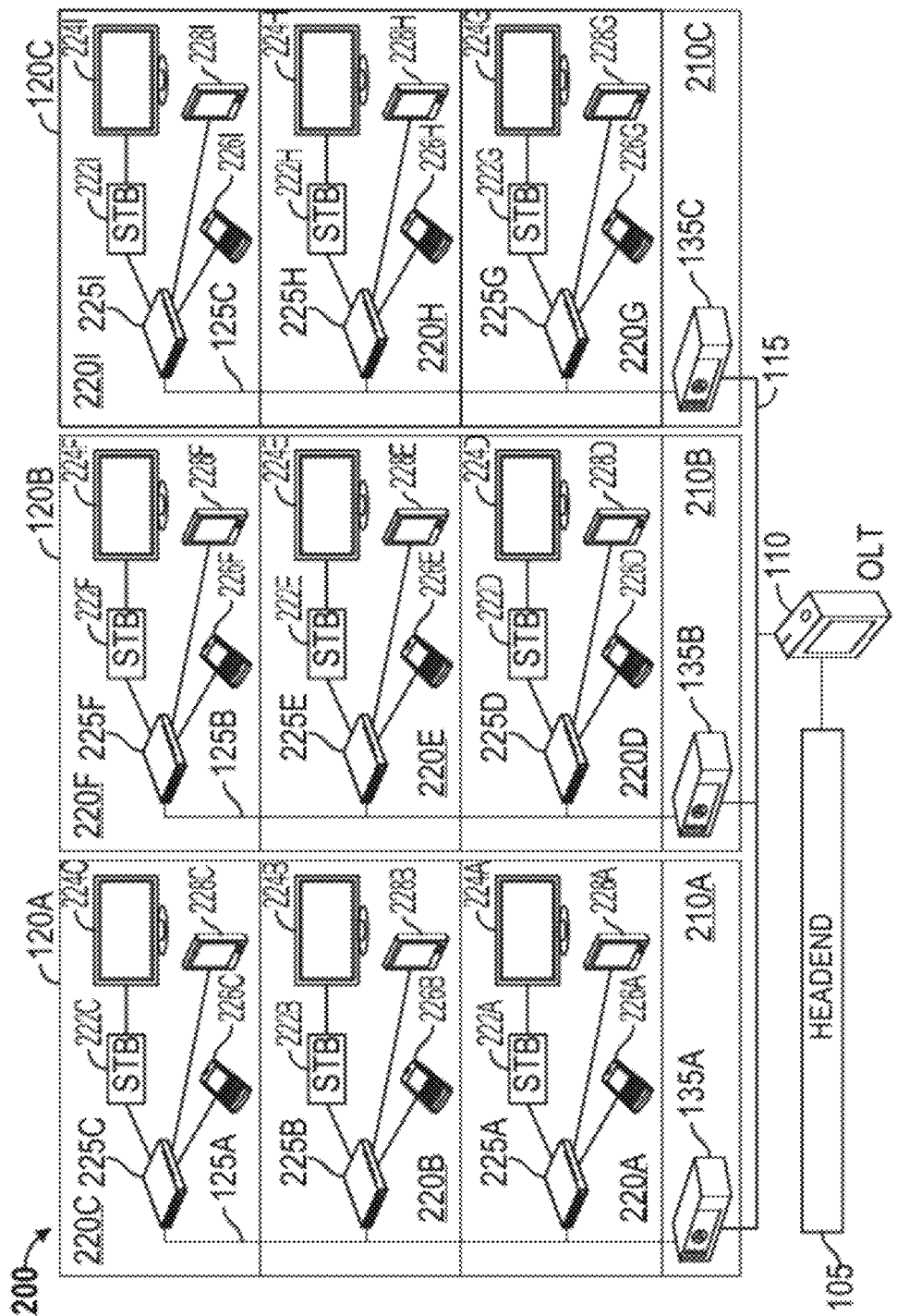
FIG. 2 illustrates an example network environment in which a content-distribution system having multimedia content recognition with local and cloud-assisted machine learning may be implemented, in accordance with one or more implementations.

FIG. 2 illustrates an example network environment 200 in which a content-distribution system having multimedia content recognition with local and cloud-assisted machine learning may be implemented, in accordance with one or more implementations. Not all of the depicted components may be required, however, one or more implementations may include additional components not shown in the figure. Variations in the arrangement and the type of components may be made without departing from the spirit or scope of the claims as set forth herein. Additional, different, or fewer components may be provided.

The example network environment 200 includes the headend 105, the OLT 110, the buildings 120A-C, the first transmission network 115 and the second transmission networks 125A-C. The buildings 120A-C include utility areas 210A-C and units 220A-I. The units 220A-I may include gateway devices 225A-I, electronic devices 222A-I, 226A-I, 228A-I and display devices 224A-I.

The utility areas 210A-C may be common areas of the buildings 120A-C, e.g., areas of the buildings 120A-C that are accessible to utility operators, such as broadband service providers. In one or more implementations, the utility areas 210A-C may be in the basement of the buildings 120A-C or external to the buildings 120A-C. The units 220A-I of the buildings 120A-C may be dwelling units, office spaces, or generally any delineated structures within the buildings 120A-C. In one or more implementations, one or more of the buildings 120A-C may represent a collection of physically separate units 220A-I, such as a subdivision of separate houses.

The gateway devices 225A-I may include a network processor or a network device, such as a switch or a router, that is configured to couple the electronic devices 222A-I, 226A-I, 228A-I to the headend 105 via the media controllers 135A-C. The gateway devices 225A-I may include LAN interfaces, such as wired interfaces and/or wireless access points, for communicating with the electronic devices 222A-I, 226A-I, 228A-I. The gateway devices 225A-I may include a local cache for caching content items and/or portions of content items and distribution-control modules for coordinating the caching of the content items.

The electronic devices 222A-I, 226A-I, 228A-I can be computing devices such as laptop or desktop computers, smartphones, personal digital assistants, portable media players, set-top boxes (STBs), tablet computers, televisions or other displays with one or more processors coupled thereto and/or embedded therein, or other appropriate computing devices that can be used for adaptive bit rate (ABR) streaming and rendering, of multimedia content and/or can be coupled to such a device. In the example of FIG. 2, the electronic devices 222A-I are depicted as STBs that are coupled to display devices 224A-I, such as televisions, the electronic devices 226A-I are depicted as smartphones and the electronic devices 226A-I are depicted as tablet devices. In one or more implementations, any of the electronic devices 222A-I, 226A-I or 228A-I may be referred to as a user device and any of the electronic devices 222A-I, 226A-I, 228A-I may be, or may include one or more components of, the electronic system that is discussed below with respect to FIG. 7.

As shown in FIG. 2, the headend 105, media controllers 135A-C, gateway devices 225A-I and electronic devices 222A-I, 226A-I, 228A-I are arranged in a hierarchical tree network arrangement such that the headend 105 is directly coupled to the media controllers 135A-C, the media controller 135A is directly coupled to the gateway devices 225A-C, the media controller 135B is directly coupled to the gateway devices 225D-F, the media controller 135C is directly coupled to the gateway devices 225G-I, the gateway device 225A is directly coupled to the electronic devices 222A, 226A, 228A, the gateway device 225B is directly coupled to the electronic devices 222B, 226B, 228B, and so on. In other words, the headend 105 is located directly upstream from the media controllers 135A-C, the media controller 135A is located directly upstream from the gateway devices 225A-C, the media controller 135B is located directly upstream from the gateway devices 225D-F, the media controller 135C is located directly upstream from the gateway devices 225G-I, the gateway device 225A is located directly upstream from the electronic devices 222A, 226A, 228A, the gateway device 225B is located directly upstream from the electronic devices 222B, 226B, 228B, etc.

The media controllers 135A-C and/or the gateway devices 225A-I may each include a cache, such as a hard drive or other memory device, that stores content items and/or portions thereof, intended for distribution from the headend 105 to one or more of the electronic devices 222A-I, 226A-I, 228A-I. Thus, the caching of the content items is distributed across two layers of network nodes in the hierarchical network arrangement; first, the media controllers 135A-C, and then, the gateway devices 225A-I. If a content item that is cached by a media controller 135A or a gateway device 225A is requested by an electronic device 222A, the content item is provided to the electronic device 222A by the media controller 135A or the gateway device, rather than by the headend 105, thereby conserving upstream bandwidth.

The headend 105 may communicate with distribution control modules of the media controllers 135A-C to coordinate caching the content items at the media controllers 135A-C. The distribution control modules of the media controllers 135A-C may also coordinate the caching of content in the subset of the downstream gateway devices 225A-I that are directly coupled to the media controllers 135A-C. For example, the media controller 135A may coordinate the caching of content in the gateway devices 225A-C. The distribution control modules of the media controllers 135A-C may communicate with distribution control modules of the gateway devices 225A-I to coordinate caching content items at the gateway devices 225A-I. The headend 105 and the distribution control modules of the media controllers 135A-C and the gateway devices 225A-I are discussed further below with respect to FIG. 3.

The headend 105 and/or the distribution control modules of the media controllers 135A-C may control the distribution of the caching such that content items, or portions thereof, that are expected to be requested by one or more of the electronic devices 222A-I, 226A-I, 228A-I are cached at the media controllers 135A-C and/or the gateway devices 225A-I that service, e.g., are directly upstream from, the electronic devices 222A-I, 226A-I, 228A-I, prior to the content items, or portions thereof, being requested by the electronic devices 222A-I, 226A-I, 228A-I. For example, when an electronic device 222A requests a content item, or a portion thereof, from the headend 105 that is cached at the gateway device 225A, or the media controller 135A, that services the electronic device 222A, the gateway device 225A or media controller 135A can intercept the request, e.g., since the request will be transmitted to the headend 105 via the gateway device 225A and the media controller 135A and the gateway device 225A or the media controller 135A can provide the cached content item, or portions thereof, to the electronic device 222A, instead of transmitting the request back to the headend 105. In this manner requested content items can be provided to the electronic devices 222A-I, 226A-I, 228A-I from a proximal network node, thereby reducing upstream congestion.

In one more implementations, the headend 105 and/or the distribution control modules of the media controllers 135A-C and/or the gateway devices 225A-I may collectively maintain a cache directory of cached content items. The cache directory may be locally stored at the headend 105 and/or at the distribution control modules of one or more of the media controllers 135A-C and/or the gateway devices 225A-I. The cache directory may include, for example, an identification of each cached content item, or portions thereof, and a network identifier, such as a uniform resource locator (URL), for accessing the content item, or portion thereof. The gateway devices 225A-I and/or the media controllers 135A-C may utilize content-redirection techniques, such as hypertext transport protocol (HTTP) redirection techniques, to allow the electronic devices 222A-I, 226A-I, 228A-I to access content items that are cached at the media controllers 135A-C and/or at the gateway devices 225A-I that are not directly upstream from the electronic devices 222A-I, 226A-I, 228A-I.

For example, a gateway device 225D and/or a media controller 135B that are located directly upstream from an electronic device 222D may intercept a request for a content item, or portion thereof, from the electronic device 222D. If the requested content item is not cached at the gateway device 225D or the media controller 135B, the gateway device 225D and/or the media controller 135B may determine, based on the locally stored cache directory, whether the requested content item is cached at another media controller 135A,C or gateway device 225A-C, E-I. If the requested content item is cached at another media controller 135A,C or gateway device 225A-C, E-I, the gateway device 225D and/or the media controller 135B may utilize an HTTP redirection technique to redirect the request of the electronic device 222D from the headend 105 to the another media controller 135A,C or gateway device 225A-C, E-I, such as the media controller 135A.

The headend 105 may partition the electronic devices 222A-I, 226A-I, 228A-I into groups based on the content items that are expected to be requested by the electronic devices 222A-I, 226A-I, 228A-I. For example, the electronic devices 222A-I, 226A-I, 228A-I may be partitioned into groups based on characteristics associated with the electronic devices 222A-I, 226A-I, 228A-I and/or characteristics associated with the users interacting with the electronic devices 222A-I, 226A-I, 228A-I, such as the level of service, e.g., channel tier, accessible to the electronic devices 222A-I, 226A-I, 228A-I, e.g., via subscriptions; the physical locations of the electronic devices 222A-I, 226A-I, 228A-I; the demographics of the users interacting with the electronic devices 222A-I, 226A-I, 228A-I; content items previously accessed by the electronic devices 222A-I, 226A-I, 228A-I, such as episodes of a serial television program; or generally any characteristics that are indicative of content items that may be requested in the future by the electronic devices 222A-I, 226A-I, 228A-I.

For a given group of the electronic devices 222A-I, 226A-I, 228A-I, such as the group of the electronic devices 222A-I, 226D-F, 228D-F that can access a particular channel tier, the headend 105 may determine one of the media controllers 135A-C that provides service to, e.g. is directly upstream from, the largest number of the electronic devices 222A-I, 226D-F, 228D-F in the group. Since the media controller 135B provides service to nine out of 15 of the electronic devices 222A-I, 226D-F, 228D-F in the group, e.g., the electronic devices 222D-F, 226 D-F, 228D-F, the headend 105 may determine the media controller 135B.

Once the media controllers 135A-C receive content items and/or portions thereof, to be cached from the headend 105, the distribution control modules of the media controllers 135A-C may identify content items that can be cached downstream at one or more of the gateway devices 225A-I, such as content items that are only expected to be accessed by a single electronic device 222A. The media controllers 135A-C may determine that a particular content item is only expected to be accessed by a single electronic device 222A based at least in part on content access patterns of the electronic devices 222A-I, 226D-F, 228D-F in the group. In one or more implementations, the content access patterns of the electronic devices 222A-I, 226D-F, 228D-F in the group may be determined by one or more of the media controllers 135A-C and/or the gateway devices 225A-I by sniffing the network protocol messages that pass through the media controllers 135A-C and/or gateway devices 225A-I. The distribution control modules of the media controllers 135A-C may coordinate moving these content items from the cache of the media controllers 135A-C to the cache of one or more of the gateway devices 225A-I. The distribution controllers of the media controllers 135A-C may then coordinate with the distribution server of the headend 105 to receive additional content items, or portions thereof, to cache, e.g., in the cache space vacated by pushing the content item down to the one or more gateway devices 225A-I.

For example, a media controller 135B may determine that a content item can be cached at one of the gateway devices 225A-I, such as the gateway device 225D, when the content item is expected to be primarily accessed by the electronic devices 222D, 226D, 228D that are directly downstream from the gateway device 225D. In one or more implementations, a content item may be cached at a gateway device 225D if the content item is expected to be primarily accessed by the electronic devices 222D, 226D, 228D that are directly downstream from the gateway device 225D and/or by the electronic devices 222E-F, 224E-F, 228E-F that are directly downstream from the gateway devices 225E-F that are directly coupled to the gateway device 225D, e.g., via the second transmission network 125B.

In one or more implementations, distribution control modules of the gateway devices 225A-I may communicate directly with the headend 105, e.g., via a distribution control module of one of the media controllers 135A-C, in order to coordinate caching content items on the gateway device that are expected to be accessed by electronic devices 222A-I, 226A-I, 228A-I that are served by the gateway device, such as based on content access patterns of the electronic devices 222A-I, 226A-I, 228A-I. For example, if a gateway device 225A includes, or is coupled to, an STB that is configured to record a television show on a weekly basis, the gateway device 225A may coordinate with the headend 105 in order to have the television program cached on the gateway device 225A prior to its air time, e.g., during off-peak hours. Similarly, if an electronic device 222A is accessing an episode of a television series on-demand via a gateway device 225A, the gateway device 225A may coordinate with the headend 105 to cache subsequent episodes of the television series, e.g., during off-peak hours. In one or more implementations, the gateway device 225A may determine the content access patterns of the electronic devices 222A, 226A, 228A served by the gateway device 225A by sniffing the network protocol messages that pass through the gateway device 225A.

Figure 3:
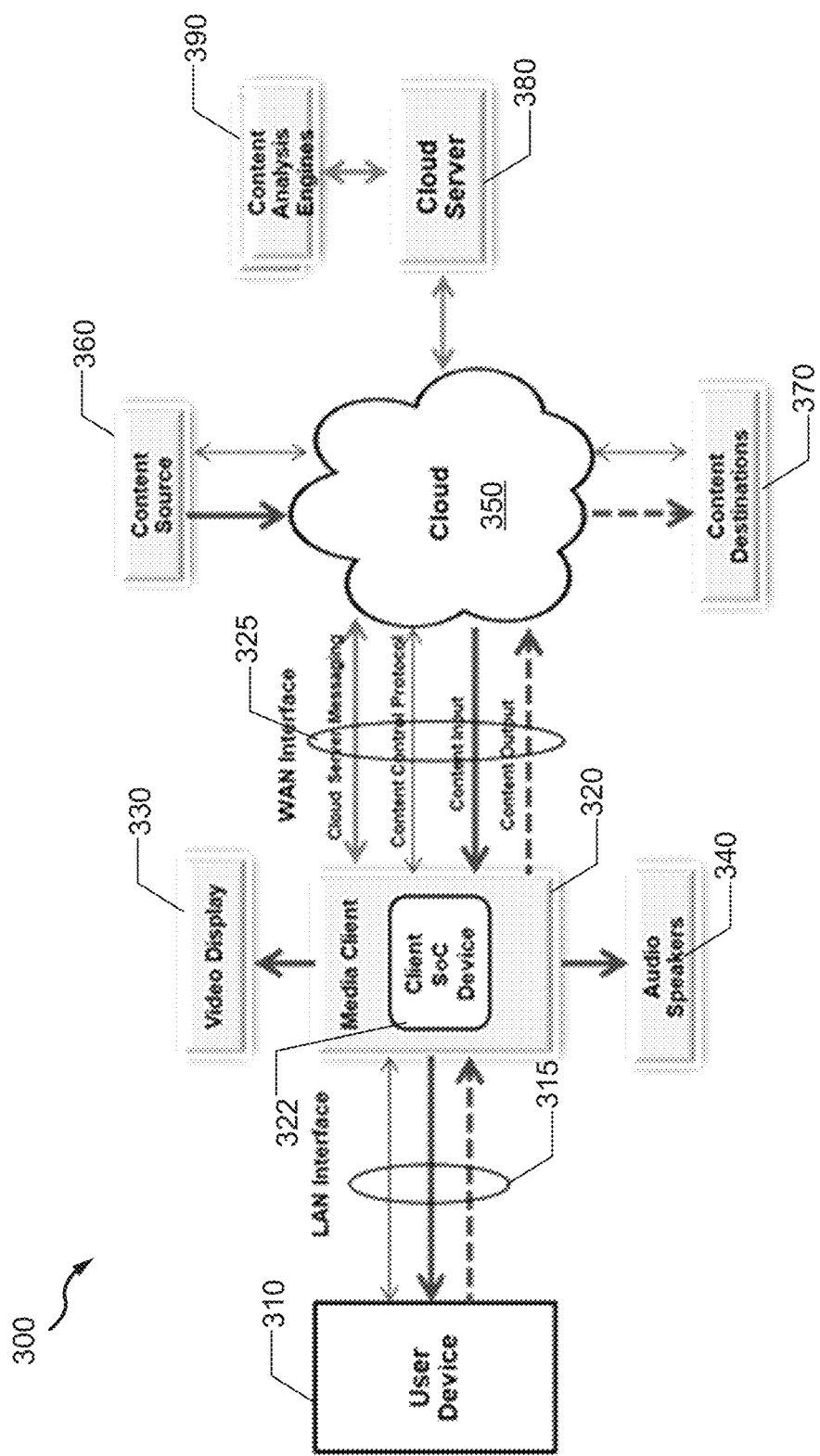
FIG. 3 illustrates a block diagram of an example network environment in which a media client having multimedia content recognition with local and cloud-assisted machine learning may be implemented, in accordance with one or more implementations.

FIG. 3 illustrates a block diagram of an example network environment 300 in which a media client 320 having multimedia content recognition with local and cloud-assisted machine learning may be implemented, in accordance with one or more implementations. The network environment 300 includes a user device 310, a media client 320 including a client SoC device 322, a video display 330, an audio speaker 340, a cloud 350, a content source 360, a content destination 370, a cloud server 380 and a content analysis engine 390. Examples of the user device 310 includes a desktop, a laptop, a handheld communication device such as a smartphone or a tablet. The client SoC device 322 in the media client 320 receives media content from a remote media content source 360 or transmits the media content to one or more remote media content destinations 370 via the cloud 350. As examples, the media content can be audio/video streamed using ABR protocol suites or images downloaded/uploaded using a file transfer protocol (FTP), a trivial file transfer protocol (TFTP) or an HTTP. The media client 320 communicates with the user device 310 via a first interface 315 such as a LAN interface, and exchanges cloud server messages, media content and media content protocols with the cloud 350 via a second interface 325, such as a wide-area network (WAN) interface. The media client 320 can send video and audio content to output devices such as the video display 330 and the audio speaker 340, respectively. The media content can be processed and rendered to the output devices or stored on the device locally. The processing can involve security processing, such as digital rights management (DRM), audio and/or video decoding and post-processing for media output.

Any given media content (e.g., video, music or pre-defined data file) has its unique signature in terms of the patterns of the content-carrying data traffic. The signature information about a given media content can be used as the input to an ML model, which is trained offline, for example, in an ML server of the cloud server 380. The input to the offline ML training process consists of appropriate analytic data on the content. For example, for a streamed video content, the signature information can be a properly selected series of still video frames or short video segments. The content analysis engine 390 is coupled to the cloud server 380. The client SoC device 322 selects the still video frames or video segments in order to facilitate the operation of the content analysis engine 390 with higher efficiency and accuracy of the analysis.

For example, the video processing function of the client SoC device 322 captures and detects people, animals, or other objects of interest in the still video frames or video segments. The client SoC device 322 only transmits the still video frames or video segments that contain the interesting characters to the cloud server 380. As another example of the selection criterion, the still video frame or video segments are selected during the periods that video processing modules do not indicate any video-processing errors (e.g., video decoder error or display effort). This is to ensure that the selected still video frames or video segments do not contain macro-blocking or other artifacts.

Such selective mechanisms used by the client SoC device 322 are to ensure that the still video frames or video segments that cannot be efficiently analyzed by the content analysis engine 390 would not be sent to the cloud server 380. The selective mechanisms also contribute to the reduction of the data traffic associated with transmitting the video information to the cloud server. To further reduce the traffic associated with the selected video frames, the client SoC device 322 can convert the color frames to their black-and-white representations if the content analysis engine 390 only works with black-and-white video frames. To support secure identification of the captured video frames and segments, some SoC or device-specific information (e.g., chip ID or device ID) can be added by the client SoC device 322 as overlaid graphic. In addition, the timestamp information can also be added as temporal identification of the captured frames and segments. Furthermore, all added information can be encrypted and digitally signed by a secure engine of the client SoC device 322 before being overlaid as graphics. For the digital signing, the video frame and/or segment data can be added along with the overlaid information as the input to the signing algorithm. This will provide secure bonding of the overlaid information with the captured video frame and/or segment and prevent tampering and repudiation of the captured video frame and/or segment and the overlaid information.

In some implementations, for a streamed audio content, the signature information can be a properly selected series of short audio segments. To facilitate the operation of the content analysis engine 390 and to reduce the traffic loading associated with transmitting the audio information to the cloud server 380, the audio processing function of the client SoC device 322 detects the silence periods so that no audio information is reported to the cloud server 380 during the silent period.

To normalize the audio segments sent to the cloud server 380, they can be captured at the output of audio volume-leveling module of the SoC device 322. To support secure identification of the captured audio segments, some SoC or device specific information (e.g., chip ID or device ID) can be added by the client SoC device 322 as embedded data. In addition, the timestamp information can also be added as temporal identification of the captured audio segments. Such added information can be embedded into the audio segment as properly positioned puncturing data. The puncturing operation is designed to minimize the impact on the fidelity of the captured audio. Furthermore, all added information can be encrypted and digitally signed by the secure engine of the client SoC device 322, before being embedded into the audio segment. For the digital signing, the audio data can be added along with the embedded information as the input to the signing algorithm. This will provide secure bonding of the embedded information with the captured audio segment and prevent tampering and repudiation of captured audio and the embedded information.

Figure 4:
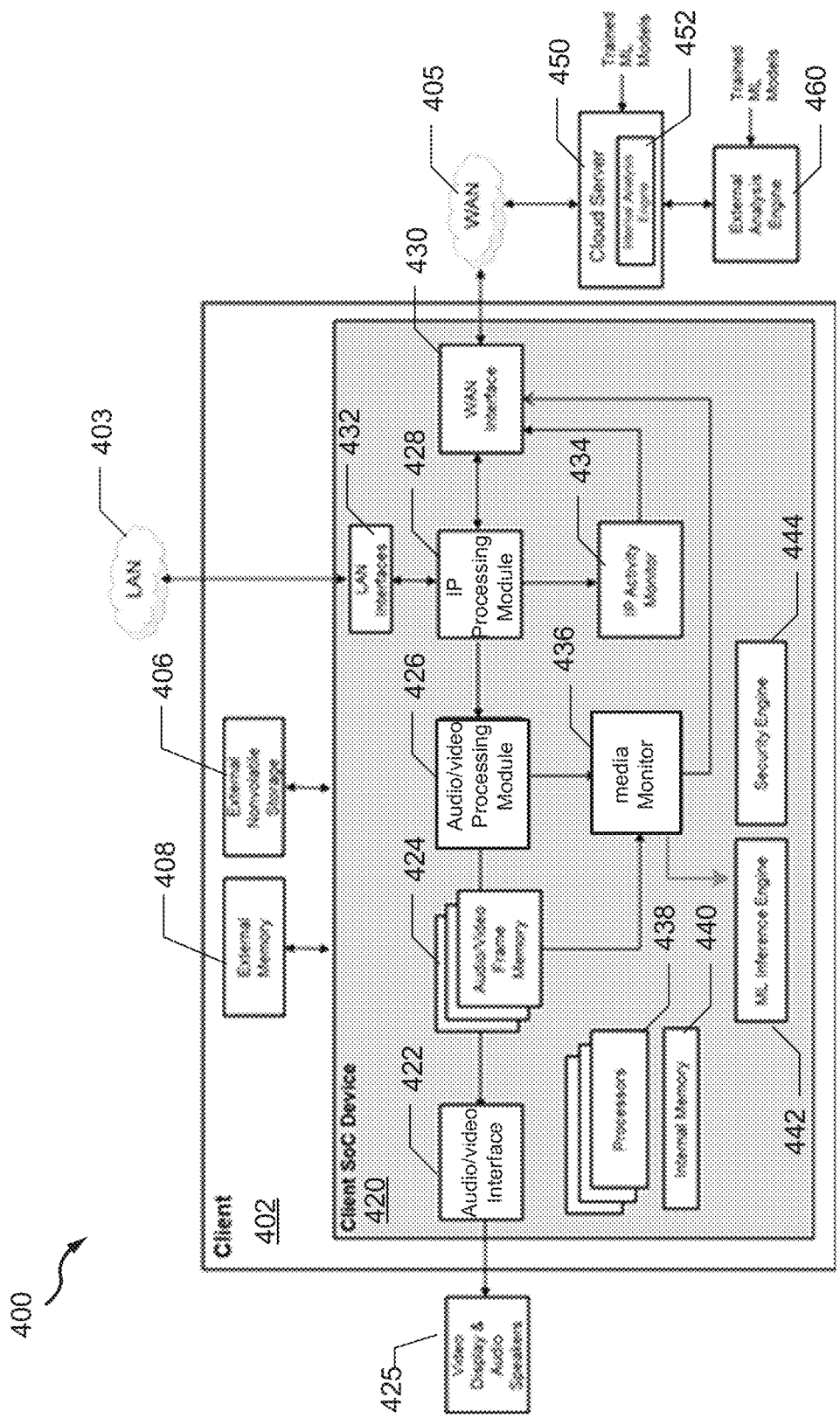
FIG. 4 illustrates a block diagram of a communication system including an example implementation of a media content including a client system-o-chip (SoC) device, in accordance with one or more implementations.

FIG. 4 illustrates a block diagram of a communication system 400 including an example implementation of a media client 402 including a client SoC device 420, in accordance with one or more implementations. The communication system 400 includes the client 402 in communication with a LAN 403 and via a WAN 405 to a cloud server 450. The cloud server 450 includes an internal analysis engine 452 and is also connected to an external (e.g., third-party) analysis engine 460. The client 402 includes a client SoC device 420, which has access to an external memory 408 and an external nonvolatile storage 406. The SoC device 420, as shown in FIG. 4, is an example implementation of the client SoC device 322 of FIG. 3.

In some implementations, the SoC device 420 includes an audio/video output interface 422, an audio/video frame memory 424, a media processing module 426, an internet protocol (IP) processor 428, a WAN interface 430, a LAN interfaces 432, an IP activity monitor 434, a media monitor 436, a processor 438, an internal memory 440, an ML inference engine 442 and a security engine 444. The LAN interfaces 432 handle communication with the LAN 403. The audio/video output interface 422 is responsible for audio/video output functionalities, including delivering audio/video content output to the video display and audio speakers 425.

The LAN interfaces 432 can represent a number of LAN modules, including but not limited to Wi-Fi, Ethernet and multimedia over coax alliance (MoCA), which may be embedded with the client SoC device 420 or the interfaces to the external LAN modules. The WAN interfaces 430 represent the WAN modules, including but not limited to cable modem, sum total of digital subscriber line (xDSL) and sum total of passive optical network (xPON), which can be embedded with the client SoC device 402 or the interfaces to the external LAN modules.

The IP processing module 428 is responsible for IP processing functions, which embody the protocol stack for the transmission/reception of media content, including the IP stack, the audio/video streaming protocols, for example, dynamic adaptive streaming over HTTP (DASH), HTTP live streaming (HLS), Microsoft smooth streaming (MSS), HTTP dynamic streaming HDS (DS) and the image and/or file downloading and/or uploading protocols such as FTP and TFTP. The analytic data associated with these IP protocol processing elements are captured, assembled and sent to the local ML inference engine 442 or the cloud server 450 by the IP activity monitor 434. Such analytic data can be obtained by the IP processing module 428 via inspection of the IP packets, by parsing the appropriate header fields of one or more protocol layers of the protocol stack. Such header fields include the 5-tuple information of source and destination IP addresses and port numbers and the protocol identification. The IP inspection can be either stateless or stateful. For stateful IP inspection, the status information for the overall IP session is captured; such information includes data URLs, rates, error rates, timestamps, etc. All these captured information can be used as the signature data for the IP activities of the client SoC device 402.

The media processing module 426 handles audio/video processing functions that are responsible for the operations on the received audio/video media, which include decoding, formatting and transformation. In particular, the decoded color video frames can be directly used as part of the signature data; alternatively, they can be transformed into black-and-white video first before being captured and sent to the local ML inference engine 442 or the cloud server 450. Furthermore, the media processing module 426 can overlay decoded video frames with graphics before being captured as signature data; alternatively, the decoded video frames and the overlaying graphics can be captured individually as separate signature data.

The video frames are captured selectively. The selection schemes are designed to facilitate the operations of the local or cloud analysis engines, such as the internal analysis engine 452 and the external analysis engine 460, to increase analysis accuracy, reduce the processing load and to increase the transmission efficiency of the capture signature data. For example, the media processing module 426 can detect certain objects of interest (e.g., having people, animals, or specific objects) in the decoded video frames and send only the frames with positive detection to the cloud server 450 or use such frames in the local ML inference engine 442.

Similarly, the audio segments are captured selectively as signature data, using the selection schemes with the similar objectives to those for the video frames. For instance, the selection can be based on the detection of certain audio characteristics such as certain music instruments, human voice and animal voice. The audio/video signature data are saved in the memory, for example, in the audio/video frame memory 424 (buffers), along with all the frames to be output to the external video display and audio speakers 425. The media monitor 436 retrieves the audio/video signature information from the audio/video frame memory 424, assembles them and sends them to the local ML inference engine 442 or the cloud server 450.

In order to facilitate the analysis engine 452 to determine whether the streamed video is a publically available trailer or a full movie, multiple video frames can be sampled and captured that span a sufficient period (e.g., up to 10 minutes). These captured frames are timestamped so that the analysis engine 452 can correlate the content recognition results of such timed series of video frames and thus determine whether the associated video is a movie trailer or full movie.

The ML inference engine 442 may perform the local ML inference or signature data filtering. The operation of the ML inference engine 442 is triggered by an ML trigger controller, which resides within the client SoC device 420 (not shown for simplicity) and incorporates distributed triggering information from the ML trigger agents embedded in various modules of the client SoC device 420. For example, the triggering information can be generated from the corresponding ML trigger agents of the media processing module 426, the IP processing module 428, the central-processing unit (CPU) processors 438, as well as the security engine 444. The triggering information can be related to timing and/or time duration, audio/video types, security attributes, etc.

The ML filtering functions within the ML inference engine 442 receives information from various other modules within the client SoC device 420, filters and/or processes such information, and produces the necessary data to be sent back to the cloud server 450 for further content-recognition processing. As examples, the inputs to the ML filtering function can include the ML raw input data captured from the audio/video frame memory 424 and the security attributes (for privacy, DRM, conditional access, etc.) associated with the audio/video content from the security engine 444. The output from the ML filtering function can be the pre-processed ML input data or the partial inferenced result from the local ML inference engine 442 itself.

One form of the pre-processing by the ML filtering function is to encrypt the ML raw input data or the partial inferenced result before sending the data to the cloud server 450. Such an operation is triggered by the data-privacy-related security attributes, and enables the cloud server 450 to cause its ML inference on the encryption-protected ML input data, as explained later. It should be noted that the media client 402 is shown as an IP client and the media is processed by the client SoC device 420 as the IP-based media. The disclosed scheme of audio/video media recognition is also applicable to the audio/video media of non-IP media clients such as the traditional QAM STBs and digital video recorder (DVR) playback modules and devices.

Returning to the signature information concept, in some implementations, for a downloaded image, the signature information can be the image itself. While the content is received, the client SoC device 420 generates or collects the necessary signature information on the content and sends the generated signature information to the cloud server 450 for media content recognition. The inference operation in the cloud can be performed by an operator analysis engine such as the internal analysis engine 452 or the external analysis engine 460, using the received signature information as the input. In particular, the analysis can be based on ML algorithms, using the models that are pre-trained and consequently kept up to date. The analysis results are sent back to the cloud server 450 as the response.

Alternatively, the cloud server 450 can also deploy pre-trained ML models to the ML inference engine in client SoC device 420. The signature information generated or collected by the client SoC device 420 is directly used as the input for the local ML inference engine that is installed with the pre-trained ML models. The inference results are sent to the cloud server 450.

In both cases, the analysis can be applied to detect unauthorized access or usage of the client SoC device. Based on the analysis results from the analysis engine or the inference results received from the client SoC device, the cloud server or the client SoC device (itself) initiates appropriate actions. In some implementations, the actions can include, for example, (1) instructing the client SoC device 420 to block certain audio/video streams (e.g., via IP packet filtering); (2) instructing the client SoC device 420 to alert or notify the user via the local audio/video output devices 422 or an application on a user device such as PC or smartphone; and (3) sending the alert or notification to a cloud server operator.

For the user's privacy protection, the user can install a secure application in the client SoC device 420 to allow the user to specify the privacy-control rules (e.g., permitted content, blacklist and/or whitelist of domain names and/or URLs). Such privacy-related information is saved in the secure domain of the internal memory 440 of the client SoC device 420 and can also be sent to the cloud server 450 for storage. The client SoC device 420 and the cloud server 450 monitor the activities of client SoC device 420, compare them with the user's privacy rules and block any access that violates the rules.

To prevent content piracy, a text token that identifies the receiver of the content can be properly embedded in the content. If a pirated content containing this token is received on the media client 402, this token can be extracted from the stream by the client SoC device 420 and sent to the cloud server 450 for analysis. Alternatively, the client SoC device 420 can detect and capture the content (e.g., video frame/ segment, audio segment, image) that contains the embedded token and send the captured content to the cloud server 450, which in turn can extract and analyze the embedded token.

For the detected unauthorized access and the user privacy intrusion, appropriate alerts are presented to the client device and/or the user and the service provider. For the alert information sent to the service provider, the entire process of data collection, transmission and processing is carried out automatically and securely without human intervention. Furthermore, the detected unauthorized access and user privacy intrusion can be presented as a score that indicates the severity of the violation.

Figure 5:
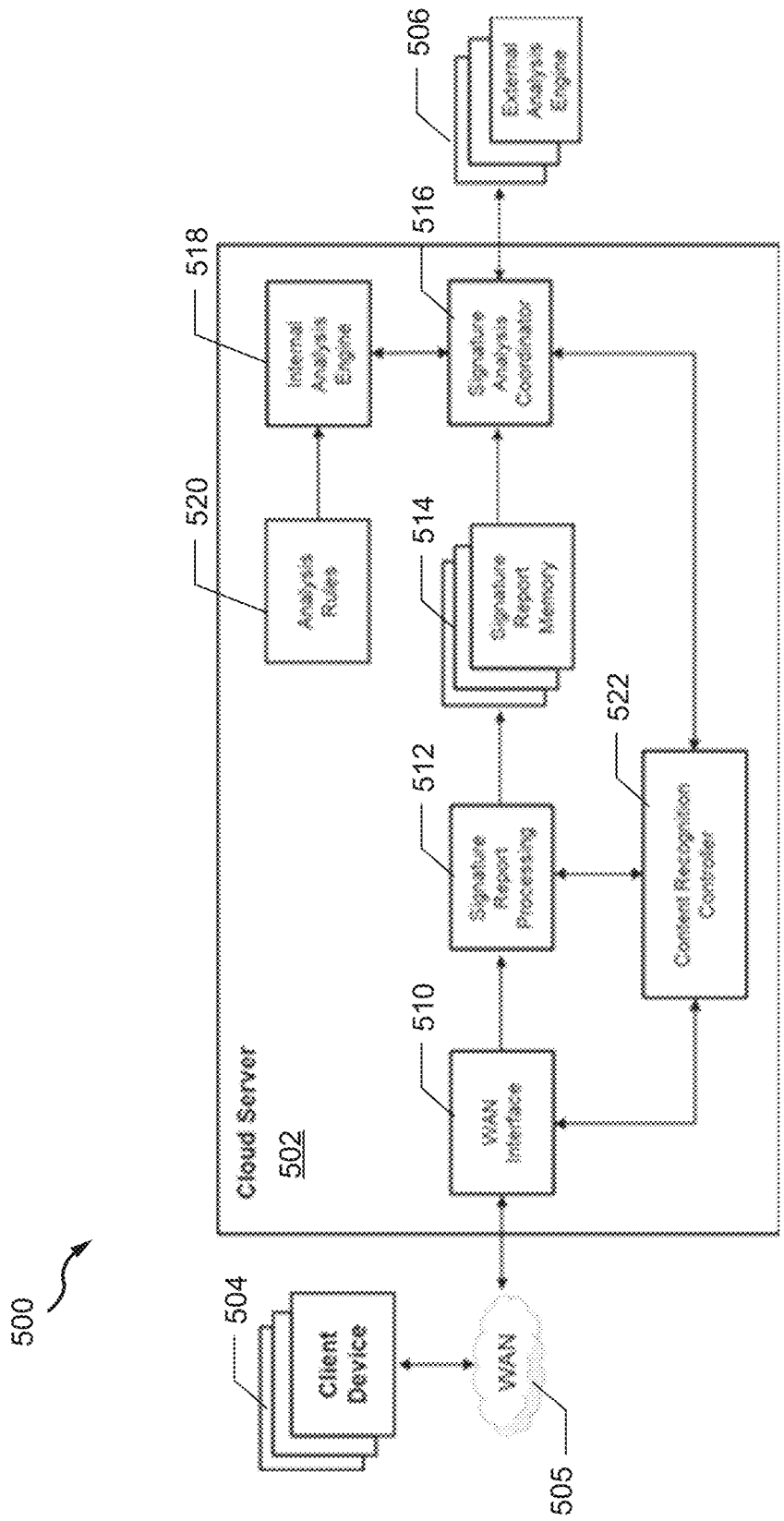
FIG. 5 illustrates a block diagram of a cloud including an example implementation of cloud server with multimedia content recognition, in accordance with one or more implementations.

FIG. 5 illustrates a block diagram of a cloud 500 including an example implementation of a cloud server 502 with multimedia content recognition, in accordance with one or more implementations. The cloud 500 includes a cloud server 502, coupled via a WAN 505 to a number of client devices 504 and a number of external analysis engines 506. The client devices 504 are similar to the media client 402 of FIG. 4 and the external analysis engines 506 are similar to the external analysis engines 460 of FIG. 4. The cloud server 502 includes a WAN interface 510, a signature report processing module 512, a number of signature report memories 514, a signature analysis coordinator 516, an internal analysis engine 518, analysis rules 520 and a content recognition controller 522. The cloud server 502 receives reported signature data from the client SoC device of the client devices 504 via the WAN interface 510, using a transport protocol such as HTTP message queuing telemetry transport.

The received signature reports are pre-processed by the signature report processing module 512, before being saved in the memory (e.g., a database) such as a signature report memory 514. The pre-processing can involve addition of appropriate metadata to the signature reports that facilitate the operations of the analysis engines (e.g., 518 or 506). The pre-processing can also involve the necessary formatting of these reports to adapt to the formats required by the analysis engines. The signature analysis coordinator 516 decides which analysis engines to use to process the received signature reports. The decision can be based on the type of the reports (e.g., audio, video, image), the specific applications involved, or any other factors of interest.

The analysis engines include an internal analysis engine 518 or an external analysis engine (e.g., cloud platforms such as those of Google, Amazon and Microsoft). For the internal analysis engine 518, appropriate analysis rules 520 can be applied to aid the analysis. In either case, the analysis can be based on any analytic techniques such as the traditional stochastic analysis or, more effectively, the artificial intelligence/ML techniques. For the ML-based analysis, the ML models can be initially obtained via offline training with existing data sets. The models can be updated and enriched using real-time data sets that are either obtained offline or newly obtained signature reports from the media clients.

The content recognition controller 522 is responsible for the control of the client SoC devices (e.g., 420 of FIG. 4) and the local processing elements within the cloud server. In particular, the content recognition controller 522 configures the client SoC device and the cloud server 502 and coordinates their operations via control messages. The control messages exchanged with the client SoC devices are carried over a secured transport protocol (e.g. HTTPs). The high-level control procedure used by the content recognition controller 522 is described in more detail herein.

Figure 6:
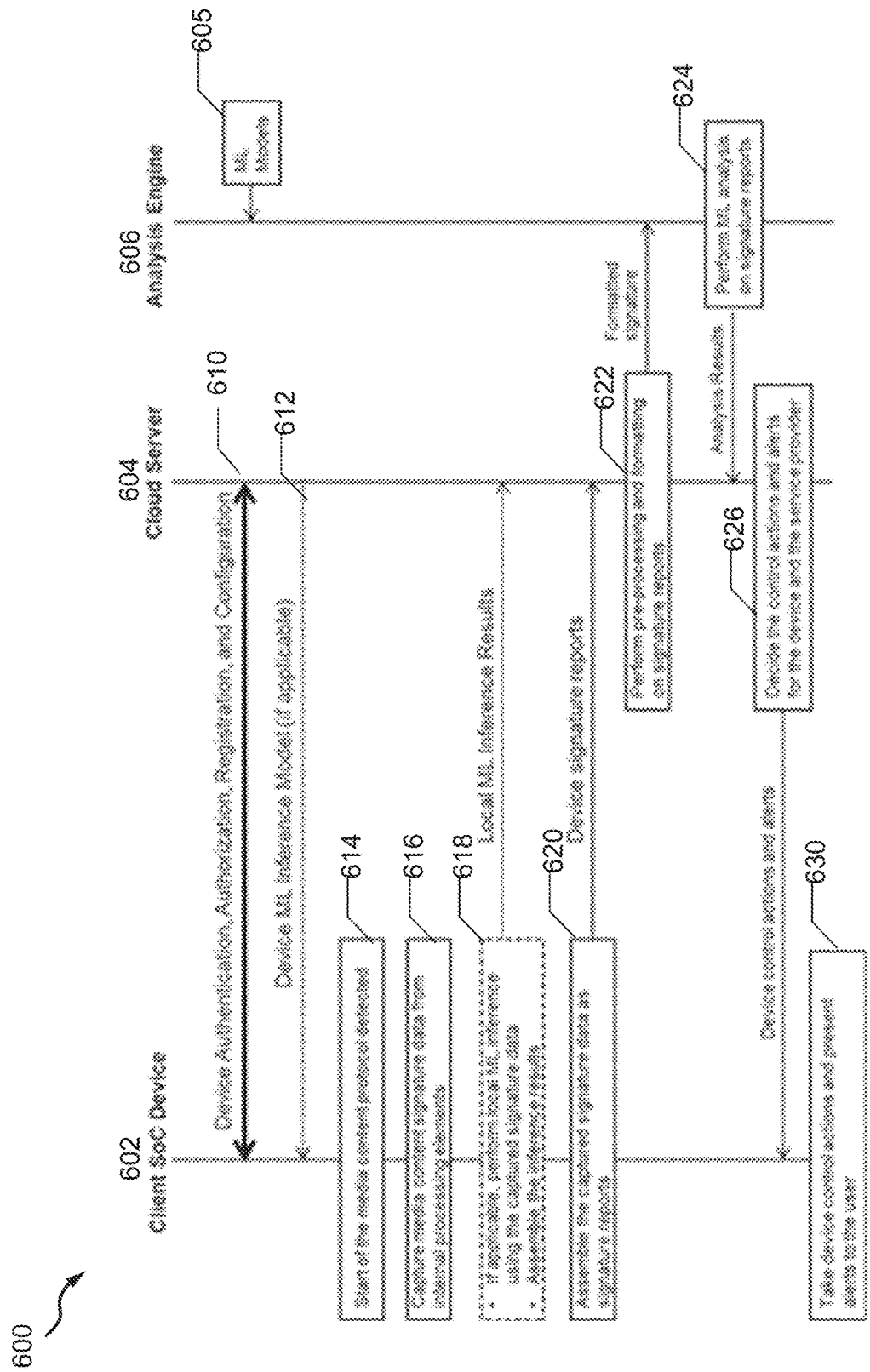
FIG. 6 illustrates a flow diagram of an example high-level control procedure content recognition controller, in accordance with one or more implementations.

FIG. 6 illustrates a flow diagram of an example high-level control procedure 600 for the content recognition controller 522 of FIG. 5, in accordance with one or more implementations. The control procedure 600, as shown in the flow diagram, includes interaction between a client SoC device 602, a cloud server 604 and an analysis engine 606, which uses ML models 605. The first step in the control procedure 600 is a step 610 relating to device authentication, authorization, registration and configuration, which is followed by a step 612 concerning providing device ML inference models, if they are applicable. In step 614, the client SoC device 602 detects media-content protocol received/transmitted by the media client (e.g., 402 of FIG. 4), and next, in step 616, captures media data content signature data from internal processing elements (e.g., 438 of FIG. 4). In step 618, the client SoC device 602 performs local ML inference (if applicable) using the captured signature data and assembles inference results for transmission to the cloud server 604. In step 622, the cloud server performs pre-processing and formatting on the signature data and submits the pre-processed and formatted signature data to the analysis engine 606. In step 624, the analysis engine 606 performs ML analysis on signature data and provides the results to the cloud server 604, which, in step 626, determines control actions and alerts for the SoC device 602 and the service provider and transmits the control actions and alerts to the client SoC device 602. Finally in step 630, the SoC device 602 take device control actions and presents the alerts to the user.

In some implementations, the described multimedia-content-recognition scheme can be applied to detect the cases where unauthorized video-streaming applications are installed on an IP STB, including the client SoC device 602, to stream unauthorized video programs. Specially, by analyzing the video signature information captured by the client SoC device (e.g., 322 of FIG. 3), the cloud server (e.g., 502 of FIG. 5) is able to recognize the video programs that are being streamed via the client SoC device and thus detect the streamed content is authorized or not by cross-checking with appropriate access control rules for the client SoC device. The detection criteria are based on the movie title, the characters and the scenes of interest, etc. The detection results are mapped into corresponding actions to be taken by the client SoC device, such as blocking the video stream associated with the unauthorized video program. Furthermore, the client SoC device can also be instructed to disable the application that is associated with the streaming of the unauthorized video program.

In some implementations, the described multimedia-content-recognition scheme can be applied to detect the cases where user-initiated content is used. While watching a cable/satellite/IP video program, the user may see something interesting (e.g., a person, animal, product, scene, object). The user indicates the interest by pushing a special button on the remote or by issuing a special voice command, upon which the IP STB initiates the following media-capturing process: (1) the STB's video-processing module (e.g., 426 of FIG. 4) captures a few still video frames or a video segment of the on-going video program and sends the captured video frames of segments to the cloud server (e.g., 604) through the Internet connection; (2) the cloud server uses the internal or external analysis engine (e.g., 606) to process the received still video frames/video segment; and (3) the processing results are appropriately formatted and sent back to the STB so that they can be rendered to the user (e.g., as overlaying graphics on the local video display). The processing results and the associated still video frames/video segment can also be saved as DVR content (in the cloud or locally), which can be played back afterwards using DVR functions (e.g., pause or step through the saved content with associated on-screen information). For the on-screen info, the service provider can include appropriate information, such as the product description, the contact information (e.g., phone number, email, web address) and so on.

In some implementations, the described multimedia-content-recognition scheme can be applied to determine the user's device usage behavior (such as preference of watched video programs). In some aspects, the subject system (e.g., the IP STB): (1) detects and classifies the media received/transmitted by the media client; (2) generates statistics associated with the detection and classification results over time to determine the patterns of detected media programs; and (3) uses the determined user-behavior patterns to improve the user-behavior-sensitive applications such as commercial insertion and targeting.

In some implementations, the described multimedia-content-recognition scheme can be applied to support and enhance parental control applications. In some aspects, the subject system: (1) detects and classifies the media received/transmitted by the media client; (2) cross checks the detection and classification results against the device usage policies set up by the parents; (3) alerts the parents if the device usage policies are violated; and 4) saves the detection and classification results and the associated signature data (e.g., captured video frames and audio segments) for the retrieval by the parents.

Figure 7:
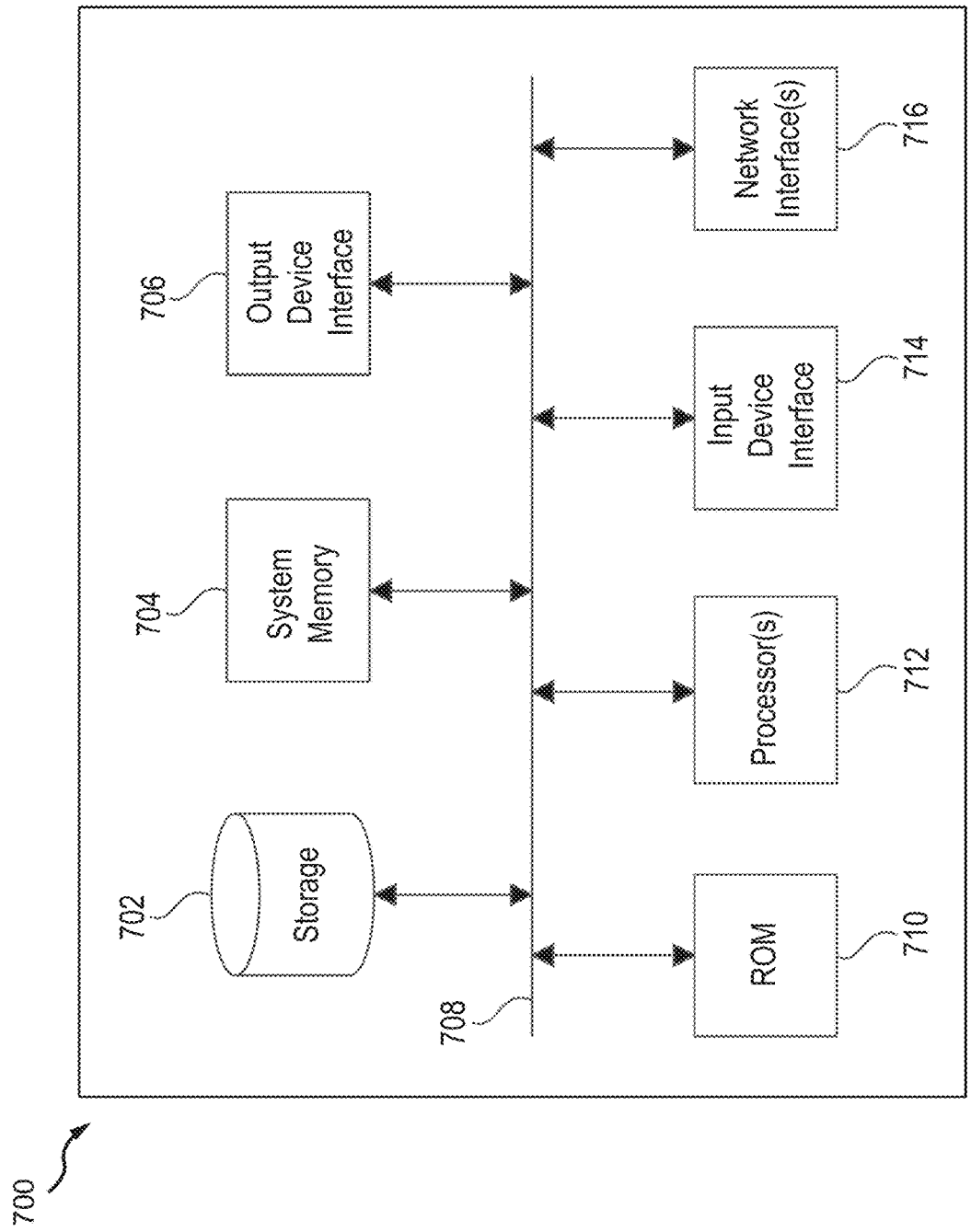
FIG. 7 conceptually illustrates an electronic system with which any implementations of the subject technology can be implemented.

FIG. 7 conceptually illustrates an electronic system 700 with which one or more implementations of the subject technology may be implemented. The electronic system 700, for example, can be a network device, a media client, an IP STB, a desktop computer, a laptop computer, a tablet computer, a server, a switch, a router, a base station, a receiver, a phone, or generally any electronic device that transmits signals over a network. Such an electronic system 700 includes various types of computer-readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706 and a network interface 716, or subsets and variations thereof.

The bus 708 collectively represents all system, peripheral and chipset buses that communicatively connect the numerous internal devices of the electronic system 700. In one or more implementations, the bus 708 communicatively connects the one or more processing unit(s) 712 with the ROM 710, the system memory 704 and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system. The permanent storage device 702, on the other hand, is a read-and-write memory device. The permanent storage device 702 is a non-volatile memory unit that stores instructions and data even when the electronic system 700 is off. One or more implementations of the subject disclosure use a mass-storage device (such as a magnetic or optical disk and its corresponding disk drive) as the permanent storage device 702.

Other implementations use a removable storage device (such as a floppy disk, flash drive and its corresponding disk drive) as the permanent storage device 702. Like the permanent storage device 702, the system memory 704 is a read-and-write memory device. However, unlike the permanent storage device 702, the system memory 704 is a volatile read-and-write memory, such as random-access memory. System memory 704 stores any of the instructions and data that the one or more processing unit(s) 712 needs at runtime. In one or more implementations, the processes of the subject disclosure are stored in the system memory 704, the permanent storage device 702 and/or the ROM 710. From these various memory units, the one or more processing unit(s) 712 retrieves instructions to execute and data to process in order to execute the processes of one or more implementations.

The bus 708 also connects to the input device interface 714 and the output device interface 706. The input device interface 714 enables a user to communicate information and select commands to the electronic system. Input devices used with the input device interface 714 include, for example, alphanumeric keyboards and pointing devices (also called cursor control devices). The output device interface 706 enables, for example, the display of images generated by the electronic system 700. Output devices used with the output device interface 706 include, for example, printers and display devices, such as a liquid crystal display (LCD), a light emitting diode (LED) display, an organic LED display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual, feedback, or tactile feedback; and input from the user can be received in any form, including acoustic, speech, or tactile input.

Finally, as shown in FIG. 7, the bus 708 also couples the electronic system 700 to one or more networks (not shown) through one or more network interfaces 716. In this manner, the computer can be a part of one or more network of computers (such as a LAN), a WAN, or an Intranet, or a network of networks, such as the Internet. Any or all components of the electronic system 700 can be used in conjunction with the subject disclosure.

Various examples of aspects of the disclosure are described below as clauses for convenience. These are provided as examples and do not limit the subject technology.

A system for securely monitoring a multimedia SoC device's network access performing the content recognition of the accessed media, with the assistance of a cloud server.

The network access data is monitored and analyzed locally by the appropriate processing functions within the SoC device in order to select the analytic data that is reported to the cloud server for analysis.

The processing functions include the media frontend such as the channel tuner (for non-IP video programs), the IP data processing module, the audio/video processing modules, the security engine and their associated (secure or isolated) memories.

The reported data is selected based on the attributes that characterize the accessed media content and serves as the "signature" data of the media content.

The signature data can be derived from the media or the SoC device's processing functions.

The obtained signature data is saved in memory.

A secure processing element fetches and assembles the saved signature data and sends the assembled signature data to the cloud server.

The start of a network IP session can be indicated by the content control protocol (e.g., for media content downloading or streaming) and can be used to trigger the start of the local signature data generation.

For a non-IP video session, the start can be indicated by, for example, the lock of the received video program or the start of the video decoder.

The signature data being sent to the cloud server may be the filtered or selected output of the ML inference engine in the SoC device.

The output can be the pre-processed ML input data or the partial inferenced result from the local ML inference engine.

One form of the pre-processing by the SoC device is to encrypt the ML raw input data or the partial inferenced result before sending the data to the cloud server, according to the data-privacy requirement of the media content.

With the reported IP-session signature data as the input, the cloud server uses ML analysis engines to detect the conditions of interest associated with the SoC device's network access.

The access to or from the Internet sites that may host malware, spam ware, virus, illegal/unauthorized audio/video sites, etc.

The input signature data include timestamped IP (Internet Protocol) session information such as IP source/destination address/port number and protocol identification, DNS query/response, URL, transmitted/received data amount, etc.

With the reported video-streaming signature data (for both IP and non-IP sessions) as the input, the cloud server uses machine-learning analysis engines to determine the properties of interest associated with the video stream.

Such properties include the movie title, the characters' names, specific scenes and actions in the video.

The input data include the still video frames or video segments captured from the streamed video.

The still video frames or video segments are selected by the SoC device based on the attributes that can facilitate the operation of the analysis engine by improving the efficiency or accuracy of the analysis.

One such selection criterion is that the still video frame or video segment has people in it.

Another selection criterion is that the still video frame or video segment is selected during the period that video processing modules do not indicate video-processing errors (e.g. video decoder error, display effort)

The captured color still video frames or video segments can be converted into their black-and-white representations by the SoC device in order to improve the transmission efficiency.

To support secure identification of the captured still video frames and video segments, some SoC or device-specific information (e.g., chip ID or device ID) can be added by the client SoC device as overlaid graphic. In addition, the timestamp information can also be added as temporal identification of the captured frames and segments.

All added information can be encrypted and digitally signed by the secure engine of the client SoC device before it's overlaid as graphics. For the digital signing, the still video frame or video segment data can be added along with the overlaid information as the input to the signing algorithm.

Along with the still video frames can be the information about the security status of the associated video stream, e.g., if or not the video stream is DRM protected.

If it is DRM protected, the analysis engine can assign DRM status to the video.

With the reported audio-streaming signature data (for both IP and non-IP sessions) as the input, the cloud server uses ML analysis engines to determine the properties of interest associated with the audio streams.

Such properties include the song/music title, song singer/writer, speaker or musician names, instrument, audio source type, etc.

The input data include audio segments captured by the SoC device from the streamed audio stream.

The audio segments can be captured at the output of an audio volume-leveling module.

To support secure identification of the captured audio segments, some SoC or device specific information (e.g. chip ID or device ID) can be added by the client SoC device as embedded data. In addition, the timestamp information can also be added as temporal identification of the captured audio segments. Such added information can be embedded into the audio segment as properly positioned puncturing data. The puncturing operation is designed to minimize the impact on the fidelity of the captured audio.

All added information can be encrypted and digitally signed by the secure engine of the client SoC device before it's embedded into the audio segment.

For the digital signing, the captured audio data can be added along with the embedded information as the input to the signing algorithm.

Along with the audio segments there can be the information about the security status of the associated audio stream, e.g., whether or not the audio stream is DRM protected.

If it is DRM protected, the analysis engine can attach legal status to the audio.

For a received content that contains a special text token (or watermark) (e.g., for the identification of the content receiver), the SoC device can extract this token from the received content and send it to the cloud server for analysis.

Alternatively, the SoC device can detect and capture the content (e.g., video frame/segment, audio segment, image) that contains the embedded token and send the captured content to the cloud server, which in turn can extract and analyze the embedded token.

The cloud analysis of the reported signature data from the SoC device can be performed internally by the cloud server or by the external analysis engines.

The analysis can be based on appropriate algorithms including those based on artificial intelligence/ML techniques.

The analysis engines can be updated in real time to reflect the latest rules/algorithms and knowledge base.

The analysis engines can include the blacklist and whitelist of URLs, domain names, IP addresses, etc.

The analysis can also be performed locally on the SoC device, by applying the captured signature data as the input to a local ML inference engine, which is configured by the cloud server.

The results of the analysis engines are processed by the cloud server to determine the appropriate actions that the SoC device can be instructed to take or that the service provider can take.

The actions by the SoC device include further collection of signature data that allows the cloud server to perform the iterative runs of analysis; blocking of certain IP packets that are transmitted or received by the SoC device; degrading of the streamed media and generation of appropriate alerts/instructions for the local user of the SoC device and the service provider.

The alerts/instructions for the local user can be presented via the local audio/video display or via an application (e.g., on a smartphone).

The process of capturing media content signature data can be triggered by incorporating distributed triggering information from various functions with the SoC device.

For example, the triggering information can be generated from the audio/video processing functions, the IP-protocol processing functions, the CPU processors, and the security engine. The triggering information can be related to timing/time duration, audio/video types or security attributes The capture of media content signature data can also be triggered by the local user of the SoC device and the media analysis results from the cloud server is formatted and presented to the user.

The formatted media analysis results can be stored with the captured media for review by the user afterward.

The storage can be on the SoC device or in a cloud database.

This function can be integrated as part of DVR service.

For the user's privacy protection, the user can install an application (e.g., on smartphone or PC) that allows the user to specify the privacy-control rules (e.g., permitted content, blacklist/whitelist of domain names/URLs).

Such privacy-related information is saved in the secure domain of the SoC device's memory (which can only be accessed by the security engine of the SoC device).

The privacy-related information can also be sent to the cloud server for storage.

The SoC device and the cloud server monitor the SoC device's activities, compare them with the user's privacy rules and block any access that violates the rules.

The logs of unauthorized access are saved in memory for review by the user and service operator afterward.

For detected unauthorized access and privacy intrusion, appropriate alerts are presented to the user and the service provider.

For the alert information sent to the service provider, the entire process of data collection, transmission and processing is carried out automatically without human intervention.

Furthermore, the detected unauthorized access and privacy intrusion can be presented as a score that indicates the severity of the violation.

The data exchanged between the SoC device and the cloud server (e.g., signature data from the SoC device and the instructions from the cloud server) are secured via encryption and authentication in order to support the data privacy, integrity and nonrepudiation.

In one or more aspects, additional clauses are described below.

A method comprising one or more methods or operations described herein.

An apparatus comprising one or more memories (e.g., 702, one or more internal, external or remote memories, or one or more registers) and one or more processors (e.g., 712) coupled to the one or more memories, the one or more processors configured to cause the apparatus to perform one or more methods or operations described herein.

An apparatus comprising means (e.g., 712) adapted for performing one or more methods or operations described herein.

A computer-readable storage medium (e.g., 702, one or more internal, external or remote memories, or one or more registers) comprising instructions stored therein, the instructions comprising code for performing one or more methods or operations described herein.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence and organization of instructions can vary significantly without varying the underlying logic, function, processing and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

The previous description is provided to enable any person skilled in the art to practice the various aspects described herein. Various modifications to these aspects will be readily apparent to those skilled in the art and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations or one or more configurations. A phrase such as "an aspect" may refer to one or more aspects and vice versa. A phrase such as "a configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "an example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise," as "comprise" is interpreted when employed as a transitional word in a claim.

Those of skill in the art would appreciate that the various illustrative blocks, modules, elements, components, methods and algorithms described herein may be implemented as electronic hardware, computer software, or combinations of both. To illustrate this interchangeability of hardware and software, various illustrative blocks, modules, elements, components, methods and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. A system for multimedia content recognition, the system comprising:
   a system-on-chip (SoC) device configured to communicate with a server via a network, the SoC device comprising:
   a media processing module configured to determine an object of interest from media content; and
   an inference engine configured to generate signature information from the object of interest, wherein in response to instructions from a server indicating unauthorized access of the media content by the client SoC device, based on the signature information, the client SoC device executes a response to the unauthorized access.

2. The system of claim 1, wherein the response comprises blocking access to an audio-video stream from a media source.

3. The system of claim 1, wherein the response comprises providing a notification of the unauthorized access.

4. The system of claim 3, wherein the notification indicates the unauthorizes access is related to use of an application installed on the client device.

5. The system of claim 1, wherein the response is based on the instructions provided by the server.

6. The system of claim 1, wherein:
   the object of interest is selected from a character, a movie title, or a scene, and
   the character, the movie title, and the scene are associated with the media content.

7. The system of claim 1, wherein the signature information comprises an audio segment associated with the media content.

8. The system of claim 1, wherein:
   the media processing module is configured to provide decoded color video frames as the object of interest, and
   the inference engine is configured to generate the signature information from the decoded color video frames.

9. The system of claim 1, wherein the media processing module is further configured to transform decoded color video frames of the media content into black-and-white video frames prior to the inference engine generating the signature information.

10. The system of claim 1, wherein the inference engine is further configured to generate inference results from the signature.

11. The system of claim 1, wherein:
    the object of interest comprises a video frame associated with the media content,
    device-specific information is added to the video frame, and
    the device-specific information is associated with the SoC device.

12. The system of claim 1, further comprising:
    a local area network (LAN) interface configured to receive the media content from a media source; and
    a wide-area network (WAN) interface configured to provide the signature information to the server.

13. A client system-on-chip (SoC) device, comprising:
an interface configured to receive multimedia content from a media source;
an Internet protocol (IP) processing module configured to capture analytic data associated with one or more IP protocols from the multimedia content; and
an inference engine configured to generate signature information based on the one or more IP protocols and provide the signature information to a server, wherein in response to instructions from the server indicating an unauthorized use of the multimedia content, based on the signature information, the client SoC device executes a response to the unauthorized use.

14. The client SoC device of claim 13, wherein the response comprises blocking at least a portion of the multimedia content via IP packet filtering.

15. The client SoC device of claim 13, wherein:
the inference engine incorporates triggering information into signature information, and
the triggering information is related to time or time duration of the multimedia content.

16. The client SoC device of claim 15, wherein:
the inference engine incorporates triggering information into signature information, and
the triggering information is related to a security attribute of the multimedia content.

17. The client SoC device of claim 13, further comprising a media processing module configured to determine an object of interest from the media content, wherein the inference engine further uses the object of interest to generate the signature information.

18. The client SoC device of claim 17, wherein:
the object of interest is selected from a character, a movie title, or a scene, and
the character, the movie title, and the scene are associated with the multimedia content.

19. A method of multimedia content recognition, the method comprising:
receiving multimedia content from a content source;
extracting an object of interest from the received multimedia content;
generating signature information from the object of interest for transmission to a server, wherein the signature information is based on triggering information related to a time duration, an audio-video type, or a security attribute of the multimedia content;
providing inference results to a server, wherein the inference results are based on the signature information; and
receiving, from the server, instructions, based on the inference results, to respond to unauthorized access to the multimedia content.

20. The method of claim 19, further comprising:
assembling the signature information and the inference results into packets for transmission to the server;
receiving, from the server, control actions and alerts for a device and a service provider, in response to transmission of the assembled signature information and the inference results to the server;
executing the control actions; and
presenting the alerts.

* * * * *